US012332796B2

(12) United States Patent
Wu et al.

(10) Patent No.: US 12,332,796 B2
(45) Date of Patent: Jun. 17, 2025

(54) DYNAMIC CACHE COHERENCE PROTOCOL BASED ON RUNTIME INTERCONNECT UTILIZATION

(71) Applicant: Intel Corporation, Santa Clara, CA (US)

(72) Inventors: Keqiang Wu, Palatine, IL (US); Lingxiang Xiang, San Jose, CA (US); Heidi Pan, Burlingame, CA (US); Christopher J. Hughes, Santa Clara, CA (US); Zhe Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/562,743

(22) PCT Filed: Dec. 15, 2021

(86) PCT No.: PCT/CN2021/138342
§ 371 (c)(1),
(2) Date: Nov. 20, 2023

(87) PCT Pub. No.: WO2023/108480
PCT Pub. Date: Jun. 22, 2023

(65) Prior Publication Data
US 2024/0303195 A1 Sep. 12, 2024

(51) Int. Cl.
*G06F 12/0831* (2016.01)
*G06F 12/084* (2016.01)
*G06F 12/0891* (2016.01)

(52) U.S. Cl.
CPC ........ *G06F 12/0835* (2013.01); *G06F 12/084* (2013.01); *G06F 12/0891* (2013.01)

(58) Field of Classification Search
None
See application file for complete search history.

(56) References Cited

U.S. PATENT DOCUMENTS

| 6,922,756 B2 | 7/2005 | Hum et al. |
| 2004/0148470 A1 | 7/2004 | Schulz |

(Continued)

FOREIGN PATENT DOCUMENTS

| CN | 104346285 A | 2/2015 |
| WO | 2021195825 A1 | 10/2021 |

OTHER PUBLICATIONS

Hay, Andrew William, "MESIF Cache Coherence Protocol", accessed Jan. 6, 2024, 251 pages.

(Continued)

*Primary Examiner* — Charles J Choi
(74) *Attorney, Agent, or Firm* — Alliance IP, LLC

(57) ABSTRACT

In one embodiment, a processor includes interconnect circuitry, processing circuitry, a first cache, and cache controller circuitry. The interconnect circuitry communicates over a processor interconnect with a second processor that includes a second cache. The processing circuitry generates a memory read request for a corresponding memory address of a memory. Based on the memory read request, the cache controller circuitry detects a cache miss in the first cache, which indicates that the first cache does not contain a valid copy of data for the corresponding memory address. Based on the cache miss, the cache controller circuitry requests the data from the second cache or the memory based on a current bandwidth utilization of the processor interconnect.

25 Claims, 13 Drawing Sheets

(56) References Cited

U.S. PATENT DOCUMENTS

2013/0151778 A1    6/2013  Daly et al.
2014/0164713 A1    6/2014  Sim et al.
2020/0210346 A1*  7/2020  Britto .................. G06F 12/0862

OTHER PUBLICATIONS

Moesif A Two-Hop Cache Coherency Protocol—MESIF: A Two-Hop Cache Coherency Protocol for Point-to-Point Interconnects (2009)—https://www.cs.auckland.ac.nz/~goodman/TechnicalReports/MESIF-2009.pdf, Nov. 2009, Accessed Jan. 6, 2024 (23 pages).
PCT International Search Report and Written Opinion issued in PCT/CN2021/138342, dated Aug. 31, 2022; 9 pages.

\* cited by examiner

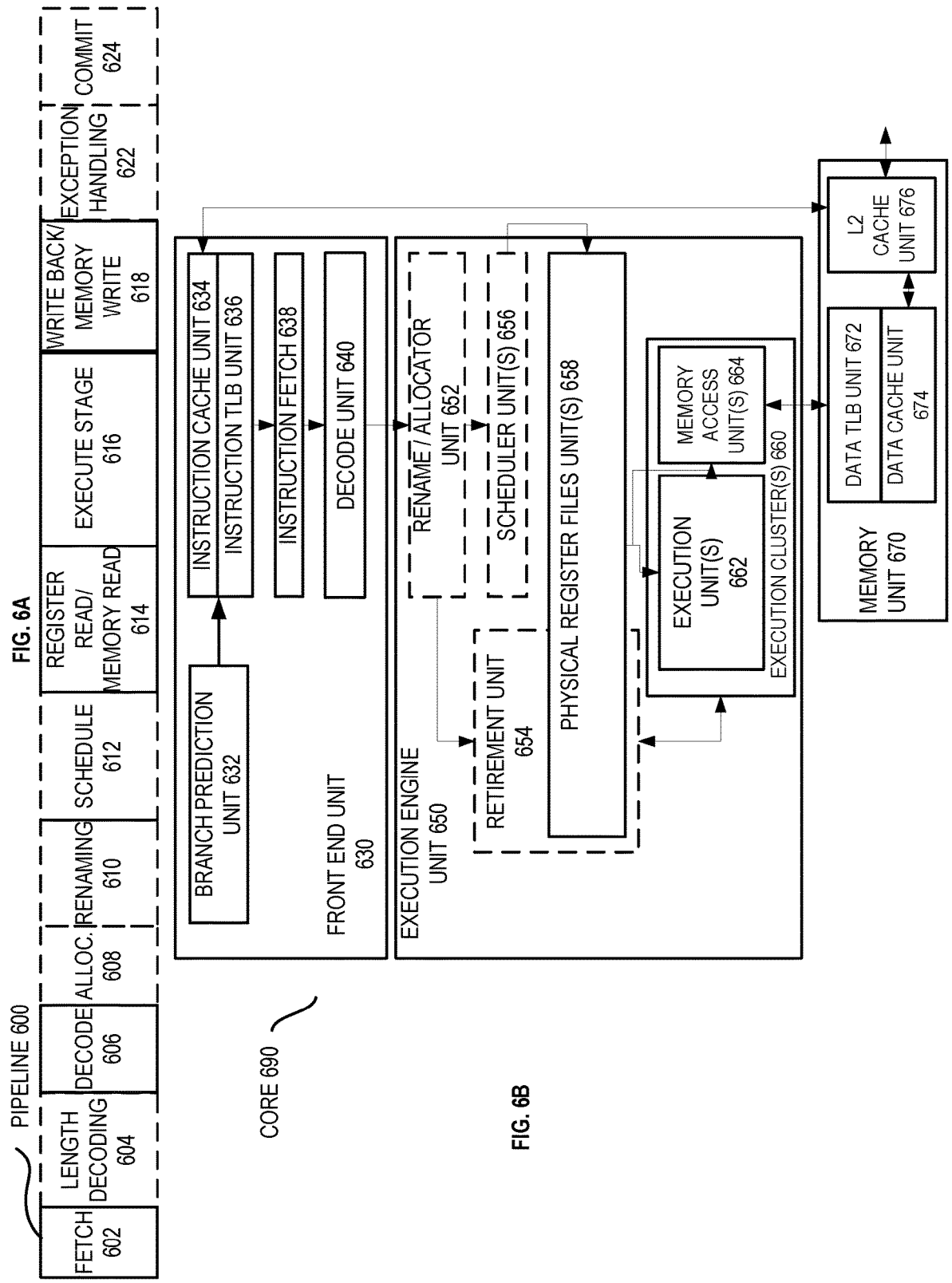

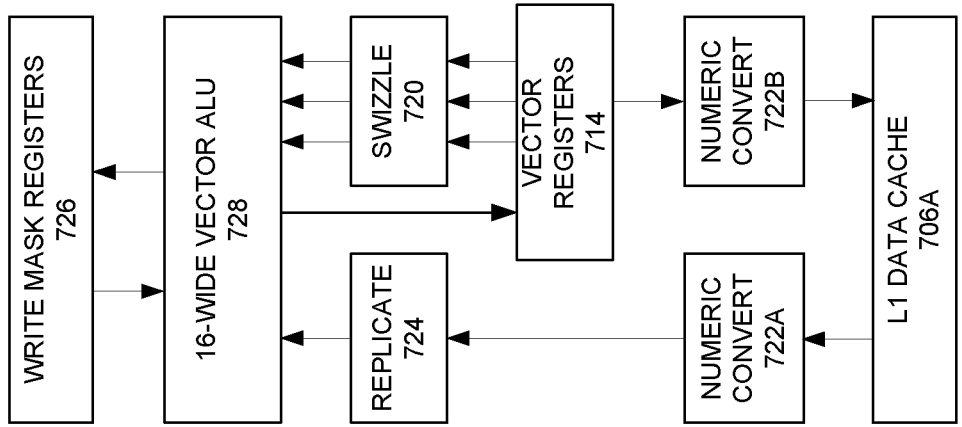
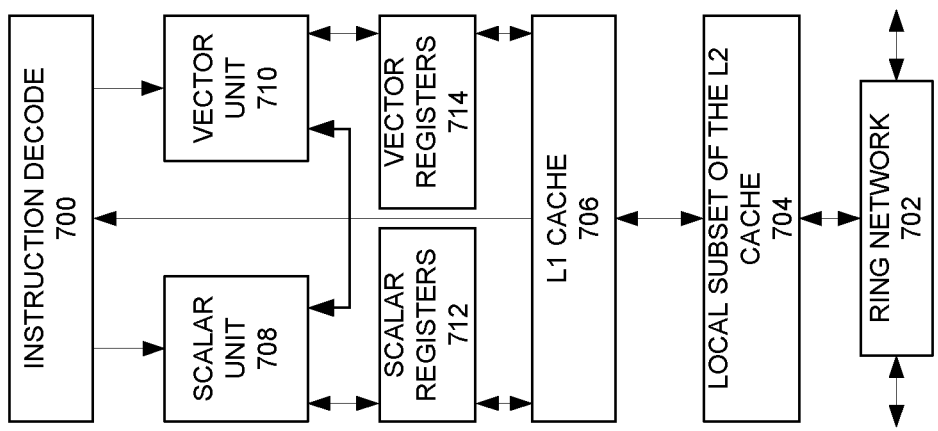

DYNAMIC CACHE COHERENCE PROTOCOL BASED ON RUNTIME INTERCONNECT UTILIZATION

CROSS-REFERENCE TO RELATED APPLICATIONS

This application is a national stage application under 35 U.S.C. § 371 of PCT International Application Serial No. PCT/CN2021/138342, filed on Dec. 15, 2021 and entitled DYNAMIC CACHE COHERENCE PROTOCOL BASED ON RUNTIME INTERCONNECT UTILIZATION. The disclosure of the prior application is considered part of and is hereby incorporated by reference in its entirety in the disclosure of this application.

FIELD OF THE SPECIFICATION

This disclosure relates in general to the field of computer architecture, and more particularly, though not exclusively, to a dynamic cache coherence protocol for non-uniform memory access (NUMA) architectures that adapts based on runtime interconnect utilization.

BACKGROUND

In a non-uniform memory access (NUMA) computing system, a cache miss in one cache is typically satisfied by requesting the data from another cache rather than from main memory, as cache-to-cache transfer latency is typically lower than memory access latency. When interconnect utilization is high, however, cache-to-cache transfer latency may increase and ultimately surpass memory access latency, which may cause a bottleneck in the system.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 6A is a block diagram illustrating both an exemplary in-order pipeline and an exemplary register renaming, out-of-order issue/execution pipeline according to certain embodiments.

FIG. 6B is a block diagram illustrating both an exemplary embodiment of an in-order architecture core and an exemplary register renaming, out-of-order issue/execution architecture core to be included in a processor according to certain embodiments.

FIGS. 7A-B illustrate a block diagram of a more specific exemplary in-order core architecture, which core would be one of several logic blocks (including other cores of the same type and/or different types) in a chip.

EMBODIMENTS OF THE DISCLOSURE

Figure 1:
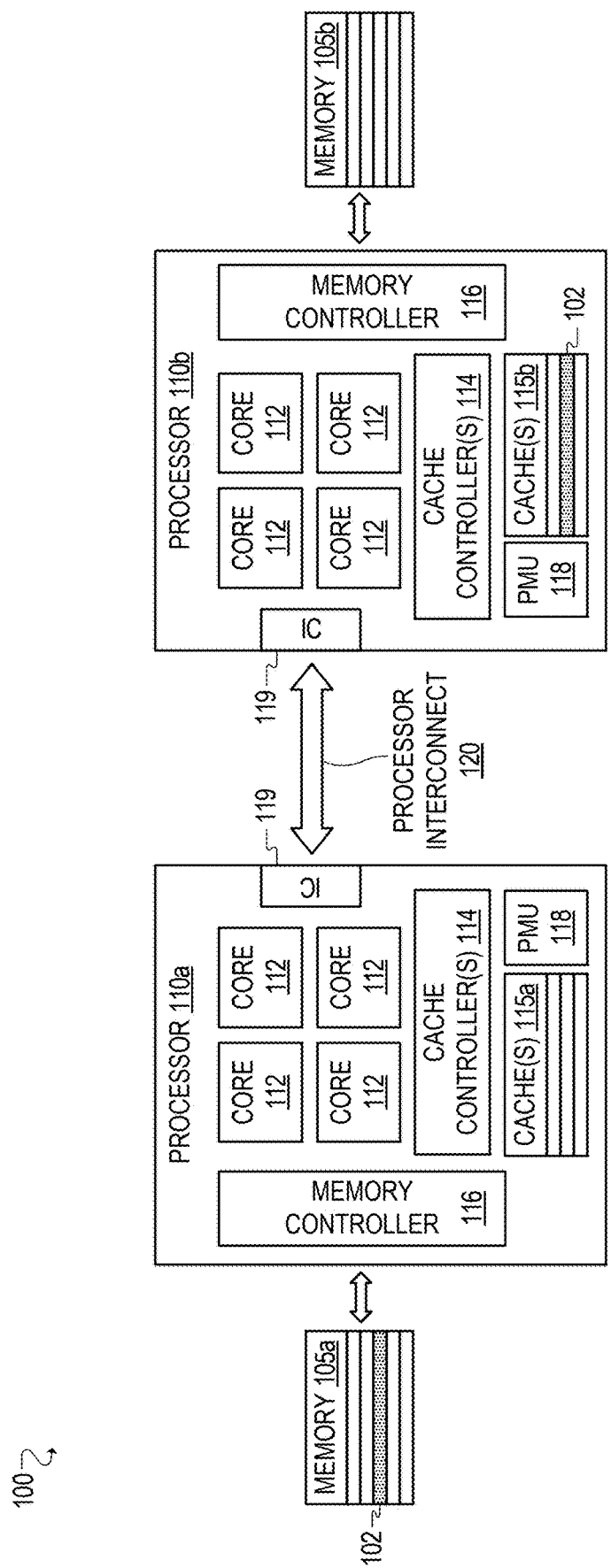
FIG. 1 illustrates a multiprocessor computing system implemented with a NUMA-aware cache coherence protocol.

The Modified, Exclusive, Shared, Invalid, and Forward (MESIF) protocol is a cache coherency protocol commonly used for non-uniform memory access (NUMA) architectures, such as those with multiple processors, processor cores, caches, and/or main memories. The MESIF protocol is described in detail in U.S. Pat. No. 6,922,756, titled "FORWARD STATE FOR USE IN CACHE COHERENCY IN A MULTIPROCESSOR SYSTEM," issued Jul. 26, 2005, and in the publication titled "MESIF: A two-hop cache coherency protocol for point-to-point interconnects," J. Goodman and H. Hum, Technical Report 2004-002, Department of Computer Science, University of Auckland, 2004, both of which are fully incorporated by reference herein.

In particular, the MESIF protocol includes the following states for the cache lines in a given cache: modified (M), exclusive (E), shared (S), invalid (I), and forward (F). The modified (M) state indicates that a cache line is "dirty" (e.g., it has been modified from its original value in main memory). The exclusive (E) state indicates that a cache line is clean (e.g., it matches the value stored in main memory) and is exclusive to the current cache (e.g., it does not currently reside in any other cache). The shared (S) state indicates that a cache line is clean and may reside in multiple caches (e.g., the current cache and at least one other cache). The invalid (I) state indicates that a cache line is invalid (e.g., inactive, out-of-date, etc.). Finally, the forward (F) state is a specialized form of the shared (S) state, which indicates that the current cache is the designated responder for any requests for that cache line. For example, when a cache line resides in multiple caches, one cache has the cache line designated in the forward (F) state while the others have it designated in the shared (S) state. As a result, when a requesting node (e.g., another cache) broadcasts a request for the cache line, the node (e.g., cache) in the forward (F) state responds to the request and forwards the cache line via an interconnect.

In this manner, the forwarding state in MESIF can leverage the bandwidth of unordered processor interconnects to ensure coherence with two-hop cache-to-cache latency. However, this approach was originally based on the assumption that these processor interconnects would have an abundance of available bandwidth, but that assumption has become obsolete due to rapid increases in computing power. As a result, high interconnect utilization has become increasingly common for state-of-art datacenter applications, such as big data analytics, business intelligence, and so forth. For these applications, high bandwidth usage due to cache-to-cache forwarding often becomes a performance bottleneck, which results in significantly higher cache-to-cache transfer latency and thus reduces overall performance.

In particular, when a packet transfers through an interconnect link, the total delay can be estimated using the following equation:

$$\text{Total Delay} = \text{Processing Delay (e.g., software overhead)} + \quad (1)$$
$$\text{Transmission Delay (e.g., determined by bandwidth)} +$$
$$\text{Propagation Delay (e.g., determined by link length and light speed)} +$$
$$\text{Queuing Delay (e.g., time spent by the packet waiting in a queue to}$$
$$\text{be transmitted on the link, varies based on the size of the queue)}.$$

Figure 4A:
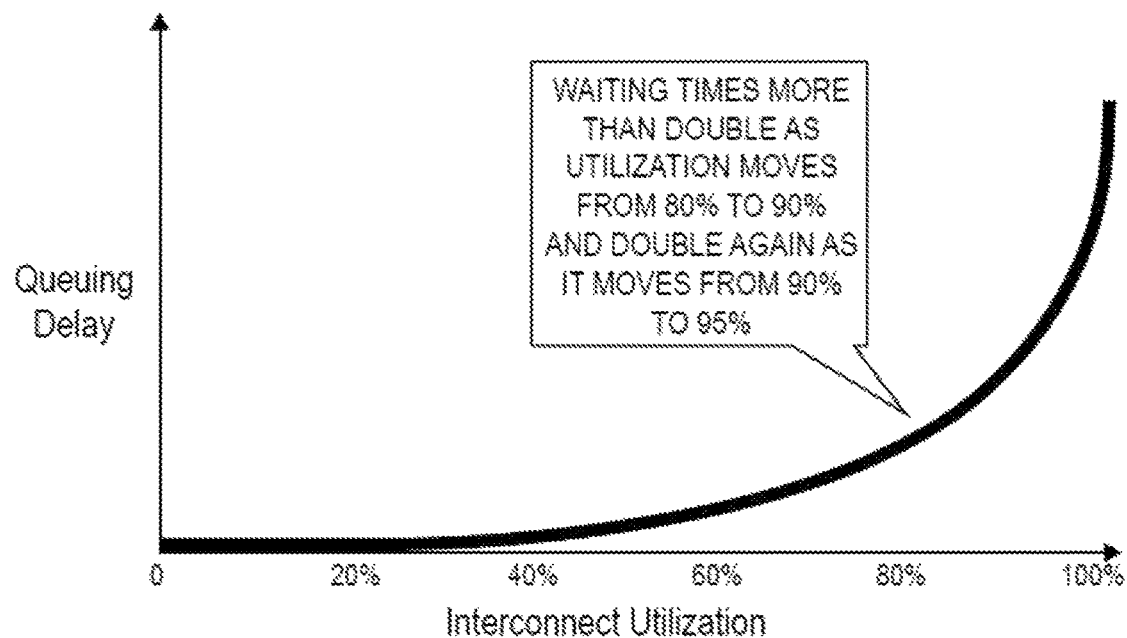
FIGS. 4A-B illustrate graphs of the problem area along with the performance of various cache coherency solutions.

Research has shown that when utilization of the interconnect reaches approximately 70% and beyond, the queuing delay increases drastically and becomes the dominant factor in the total delay, as depicted in FIG. 4A. In particular, FIG. 4A shows a graph that depicts the correlation between queuing delay and interconnect utilization. As shown in the graph, the queuing delay increases very gradually until the interconnect utilization reaches approximately 60-70%, at which point the increase in queuing delay becomes increasingly steep. In particular, the queuing delay more than doubles as utilization jumps from 80% to 90%, and then doubles once again as utilization jumps from 90% to 95%. As a result, cache-to-cache transfer latency increases significantly, which decreases interconnect throughput and reduces overall compute performance.

While cache coherent NUMA (ccNUMA) architectures often leverage various optimizations designed to reduce data access latency, current solutions are still susceptible to the steep increases in cache-to-cache transfer latency caused by high interconnect utilization. In general, these solutions can be classified as hardware-based, software-based, or hybrid (e.g., hardware/software-based), as described below in further detail.

Hardware-based approaches are typically implemented in the interconnection technologies of computer processors (e.g., Intel's QuickPath Interconnect (QPI) and Ultra Path Interconnect (UPI), AMD's HyperTransport (HT) (formerly known as Lightning Data Transport (LDT)), Arm's Core-Link Interconnect). These hardware-based approaches typically focus on increasing the capacity/speed of the underlying hardware through advancements in signal/fab processing technology, such as increasing the data rate and/or the number of links on a single die. However, these hardware approaches do not scale as the behavior and/or bandwidth demands of applications change at different phases of execution. They also lack the flexibility to adapt to different skews (e.g., when the top bin has more cores). Moreover, as silicon approaches the 3-nanometer (nm) level, the challenge in transistor design is increasingly daunting, which makes it increasingly difficult to improve interconnect performance solely through hardware-based optimizations.

Software-based approaches include software optimizations to enable NUMA-awareness and/or balancing to avoid or minimize cross-socket communication and traffic. Some software-based approaches intend to improve data locality via NUMA-aware software optimizations. These approaches typically demand a lot of engineering resources, and in some cases, they may not be feasible or may not be production friendly despite showing performance advantages in the lab.

In particular, developing large-scale applications with NUMA-awareness is extremely challenging and requires a significant investment in engineering resources. Many large software vendors opt against developing NUMA-aware applications due to these challenges, as enabling NUMA-awareness in their software applications would require many major components to be almost completely rewritten, which has not been business justifiable.

Moreover, some software applications are inherently NUMA unfriendly. For example, big data applications manage massive volumes of data—which are growing exponentially with time (e.g., 10+ terabytes (TB) per day)—and data shuffling has become an essential technique to take on this challenge. For example, in server farms for big data analytics (e.g., using open source and/or commercial analytics software), it has become standard practice to have multiple executors running concurrently and collaboratively on each server platform. Moreover, given that each executor is only capable of handling a small portion of the overall data, data exchange among those executors becomes inevitable. As a result, improving cross-socket and cross-platform communication efficiency becomes critical to the performance of these big data applications.

Further, in some cases, software-based NUMA optimizations can hurt performance significantly in production even when they help performance in the lab. In theory, NUMA balancing helps improve application performance, which has been shown by various benchmarks and workloads in lab environments. As a result, automatic NUMA balancing is enabled by default in some operating systems. Production environments are much more complex than lab environments, however, and NUMA balancing may ultimately be counterproductive and reduce performance in some production environments, which has led certain vendors to disable NUMA balancing by default.

Hybrid approaches typically improve interconnect data transfer efficiency by leveraging runtime profiling information in connection with other technologies, such as accelerator-based adaptive compression technology. As an example, Adaptive Compression-based Interconnect (ACI) technology integrates the compression/decompression capability into the interconnect controller between processors.

Despite the various optimizations provided by these solutions, however, they are still susceptible to the bottleneck that occurs when high interconnect utilization causes cache-to-cache transfer latency to increase drastically.

Accordingly, this disclosure presents a dynamic NUMA-aware cache coherence protocol with adaptive behavior based on runtime interconnect utilization. In particular, to optimize data access latency, multiple factors must be taken into account, such as local versus remote cache/memory access, cache-to-cache transfer latency versus local memory fetch latency, interconnect bandwidth usage, and so forth. Thus, based on these considerations, the described solution leverages runtime profiling information to reduce interconnect traffic and therefore improve data access efficiency.

For example, when interconnect link utilization is high, queuing delay becomes the dominant factor in the latency of interconnect traffic, which causes cache-to-cache transfer latency to increase. As a result, the original assumption of the MESIF protocol—that cache-to-cache transfers are faster than memory access—may become invalid, as cache-to-cache transfer latency may eventually increase beyond memory access latency when interconnect utilization is high.

Accordingly, by considering the runtime interconnect traffic, the described solution dynamically enables/disables the "forwarding" state in the MESIF cache coherence protocol. For example, when interconnect link utilization is high (e.g., ~70% bandwidth utilization and beyond), this NUMA-aware cache coherency solution disables cross-socket cache-to-cache transfers and ensures that data is provided from memory (e.g., via the local home node), which avoids further intensifying the interconnect traffic. When the interconnect traffic reduces, the protocol reverts back to traditional MESIF behavior and reenables cross-socket cache-to-cache transfers. As a result, this NUMA-aware MESIF solution optimizes the data transfer efficiency under different load levels.

This solution provides numerous advantages. For example, this solution can be implemented entirely in cache controller logic, and thus it requires no additional hardware changes and is fully transparent to software applications. As a result, this solution not only dynamically minimizes data access latency, but it also provides the flexibility to scale out to different central processing unit (CPU) skews of different platforms (e.g., 2-socket, 4-socket, 8-socket, etc.) and adapt to changing behavior of different applications.

Moreover, the solution optimizes cache coherence protocols by monitoring interconnect traffic and adapting their behavior accordingly. As a result, this solution maximizes data access efficiency and effectiveness in datacenters, and also adapts to different applications with different interconnect characteristics and runtime profiles, which is particularly beneficial to cloud service providers (CSPs) and independent software vendors (ISVs).

For example, CSPs currently only deploy a fraction of their servers in 4-socket (4S) configurations for running traditional enterprise workloads. The key reason is due to the strain on interconnect bandwidth, which has been a limiting factor for scaling 4-socket systems to a broader set of workloads. As an example, in Infrastructure-as-a-Service (IaaS) usage models, if interconnect bandwidth becomes a limiting factor for large virtual machines (VMs) that span multiple sockets, end-user quality of service (QoS) can be negatively impacted. However, the described solution deters interconnect bandwidth from becoming a bottleneck, which enables a broad set of workloads to run on large multi-socket configurations (e.g., 4-socket and beyond), thus optimizing the total cost of ownership (TCO) for CSPs.

This solution can also be leveraged to enable one top-bin processor (e.g., with a fixed number of interconnect links) to provide optimal interconnect performance for a wider selection of software applications with different performance characteristics.

This solution also has more general applicability beyond MESIF-based multiprocessor architectures. In particular, this solution can also be applied to other cache coherence protocols aside from MESIF, along with single-socket servers and emerging chiplet designs. In single-socket servers, for example, sub-NUMA clustering (SNC) and/or cluster-on-die (COD) configuration modes can be used to break up the last level cache (LLC) into disjoint clusters based on address range, with each cluster bound to a subset of the memory controllers in the system. The interconnect bandwidth capacity between clusters is also reduced, as the interconnect links are split between clusters. Likewise, in emerging chiplet designs, multiple chiplets (e.g., a group of CPU cores) are packed into a single CPU die with each chiplet having its own NUMA memory. Similar to interconnect links, those chiplets are connected through inter-chiplet links with relatively low bandwidth. For both single-socket servers and chiplets, current approaches assume that the system can make a static choice about the best agent to service data requests (e.g., in single-socket systems, an L3 cache services an L2 miss whenever possible, rather than having another L2 cache service the miss). As detailed above, however, a static choice is not always optimal.

Accordingly, single-socket servers, chiplets, and other similar form factors can leverage the described solution to enable dynamic decisions about cache behavior based on bandwidth utilization, thus optimizing data access latency, increasing interconnect throughput, and improving overall performance.

The solution is described in further detail in connection with the remaining figures.

FIG. 1 illustrates a multiprocessor computing system 100 implemented with a NUMA-aware cache coherence protocol. In the illustrated example, computing system 100 includes multiple processors 110a,b, memories 105a,b, and a processor interconnect 120. Each processor 110a,b includes multiple cores 112, one or more caches 115a,b and cache controllers 114, a memory controller 116, a performance monitoring unit (PMU) 118, and an interconnect controller 119. Each processor 110a,b is also coupled to a memory 105a,b via its corresponding memory controller 116. Moreover, the processors 110a,b and their respective components are coupled to each other via the processor interconnect 119 using their respective interconnect controllers 119.

In some embodiments, computing system 100 may be implemented using the same or similar components as those shown and described in connection with the computing devices and systems of FIGS. 6-12. In actual embodiments, for example, each processor 110a,b may include multiple caches 115a,b and cache controllers 114, which may be distributed across their respective components. In some embodiments, for example, each core 112 of a processor 110a,b has its own level 1 (L1) and/or level 2 (L2) cache, and the respective cores 112 of each processor 110a,b also share a last level cache (LLC). Moreover, in some embodiments, the shared LLC is physically distributed across the cores 112, such that each core 112 has a corresponding slice of the shared LLC. Further, the processors 110a,b and/or cores 112 also include corresponding cache controllers 114 for their respective caches. Further, in various embodiments, the processors 110a,b may be connected to computing system 100 via corresponding processor sockets (not shown), or the processors 110a,b may be integrated as part of the same chip, among other examples.

In multiprocessor systems such as computing system 100, it is inevitable to have multiple copies of shared data 102, such as one copy in main memory 105a and another copy in the local cache 115b of a processor 110b that requested the data. When one of the data copies is modified, the other copies must reflect that change. The purpose of a cache coherence protocol is to ensure that changes in the values of shared operands (data) are propagated throughout the system in a timely fashion. Having an effective and efficient cache coherence protocol is critical to the performance of multiprocessor systems.

Many cache coherence protocols rely on the concept of "nodes," which generally refer to the different components of a system that may cache and/or request data. In a multiprocessor system, for example, each processor 110a,b—and its associated caches 115 and cache controllers 114—may be considered a node. Further, in a multicore processor 110a,b, where each core 112 typically has its own caches 115 and cache controllers 114, along with a shared cache 115 shared across all cores 112, each core 112 and its associated caches 115 and cache controllers 114 may be considered a node, and the shared cache 115 and its associated cache controller 114 may also be considered a node (which may itself be distributed across various components, such as the cores 112).

To assist in memory requests, each cache line typically has a unique home node in the system, which is responsible for reading and writing the data for that cache line to and from main memory. For purposes of that cache line, all other nodes are considered peer nodes.

With respect to the MESIF cache coherence protocol, Table 1 shows the possible cache states for the home node versus the peer nodes. As described above, MESIF includes the following states for cache lines: modified (M), exclusive (E), shared (S), invalid (I), and forward (F).

With respect to the shared (S) and forward (F) states, when a cache line resides in multiple caches, one cache holds the cache line in the forward (F) state, while the others hold it in the shared (S) state. In this manner, when another cache in the system has a miss for that cache line, the cache in the forward (F) state services the miss to avoid having all caches in the shared (S) state respond. Thus, the forward (F) state ensures that shared unmodified data is forwarded only once, with the intent of reducing interconnect traffic.

After servicing the request, the cache in the forward (F) state transitions to the shared (S) state, and the cache that just loaded the cache line enters the forward (F) state. The rationale is that the most recent cache to load the cache line is the least likely to evict the line.

TABLE 1

Possible states of data copies in MESIF.

| Home Node | Peer Nodes | |
|---|---|---|
| | Forwarding | Shared |
| Exclusive | 0 | 0 |
| Forward | 0 | 1 or more |
| Invalid | Modified | 0 |
| Invalid | Exclusive | 0 |
| Invalid | Forwarding | 0 or more |

For large-scale applications such as big data analytics, the forwarding mechanism in MESIF can trigger a performance bottleneck. For example, if an application is not NUMA-aware, the forwarding behavior in MESIF can introduce a ping-pong effect between sockets, which results in high interconnect traffic, and by extension, poor performance and scalability. Rather than attempt to resolve this issue via various hardware and/or software optimizations, which are generally ineffective or impractical, this disclosure presents a cache coherence protocol with NUMA-awareness, which resolves the issue in a manner that is completely transparent to software applications.

In some embodiments, for example, the cache coherence protocol presented in this disclosure is implemented as a NUMA-aware MESIF-based protocol, referred to herein as NaMESIF. In particular, the NaMESIF protocol optimizes the "forwarding" state in MESIF by adapting its behavior based on the runtime bandwidth usage of the interconnect link 120, which is monitored during runtime using the performance monitoring unit (PMU) 118 of each processor 110a,b (or any other hardware- and/or software-based performance/event monitoring technology).

In particular, when interconnect link traffic is high, cache-to-cache transfer latency drastically increases and ultimately surpasses memory access latency, which makes it faster to obtain data from local memory than from remote cache-to-cache transfers. As a result, by considering the runtime interconnect traffic, NaMESIF dynamically enables/disables the "forwarding" state in the MESIF cache coherence protocol. For example, when interconnect link utilization is high (e.g., ~70% bandwidth utilization and beyond), NaMESIF disables cross-socket cache-to-cache transfers and ensures that data is provided from memory (e.g., via the local home node), which avoids further intensifying the interconnect traffic by freeing up interconnect bandwidth that would normally be consumed by cache-to-cache transfers. When the interconnect traffic reduces, NaMESIF reverts back to standard MESIF behavior and reenables cross-socket cache-to-cache transfers. As a result, NaMESIF optimizes the data transfer efficiency under different load levels.

In the example shown in computing system 100, data 102 associated with a particular memory address resides in both (i) local memory 105a of processor 110a and (ii) remote cache 115b of processor 110b. The data 102 does not reside in local cache 115a of processor 110a or in remote memory 105b of processor 110b. When interconnect traffic is at normal levels (e.g., under 70% bandwidth utilization), a cache miss in local cache 115a of processor 110a is serviced via a remote-cache-to-cache transfer over the interconnect 120 from remote cache 115b of processor 110b. However, when interconnect traffic is high (e.g., 70% bandwidth utilization or higher), a cache miss in local cache 115a of processor 110a is serviced via local memory 105a of processor 110a rather than from remote cache 115b over the interconnect 120. In this manner, some of the interconnect 120 bandwidth that would normally be consumed by remote cache-to-cache transfers frees up, which allows the cache-to-cache transfer latency to remain relatively constant instead of drastically increasing.

Figure 2:
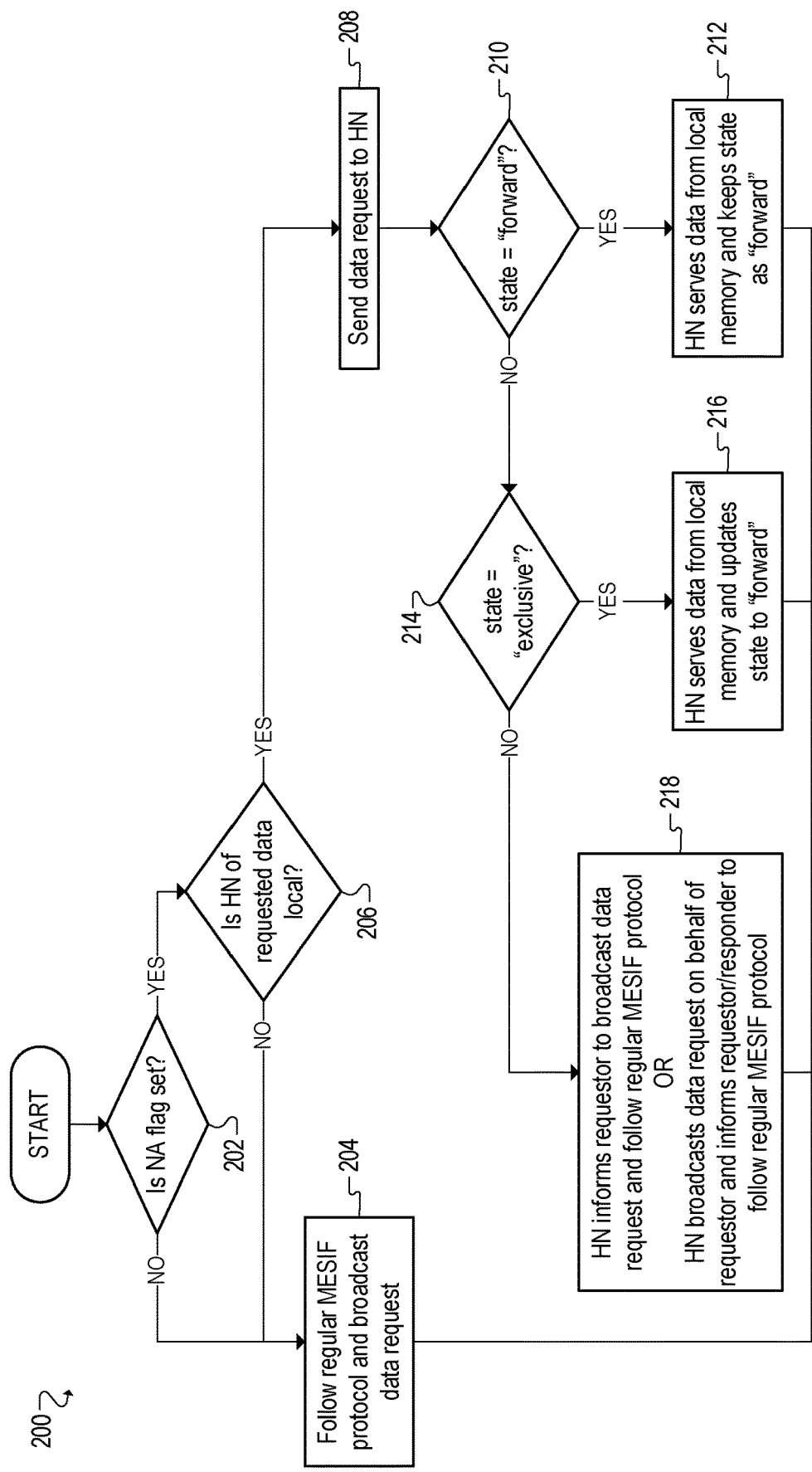
FIG. 2 illustrates an example process flow for a NUMA-aware Modified, Exclusive, Shared, Invalid, Forward (MESIF) cache coherence protocol that adapts based on runtime interconnect utilization.

FIG. 2 illustrates an example process flow 200 for a NUMA-aware MESIF (NaMESIF) cache coherence protocol that adapts based on runtime interconnect utilization. In some embodiments, process flow 200 may be performed by the computing devices and systems illustrated and described throughout this disclosure (e.g., the computing devices and systems of FIGS. 1, 3, 6-12).

The NaMESIF protocol periodically monitors the interconnect link bandwidth traffic, and depending on the traffic, a NUMA-aware (NA) hardware flag is dynamically enabled or disabled to control the behavior for responding to a cache miss. In some embodiments, for example, through runtime profiling, the NA flag can be set when the interconnect link traffic exceeds a threshold for a certain duration (e.g., 70% for the past 1000 samples). Once the NA flag is set, it can be reset if the traffic reduces (e.g., less than 60% for the past 1000 samples).

If NA flag is set, the cache controller handles an LLC miss differently if the home node of the requested data (the node with the original memory copy) and the requestor are on the same socket. Instead of broadcasting the data request across the interconnect (e.g., traditional MESIF behavior), the requester sends a request to the home node for the data directly from local memory.

Even if the NA flag is set, however, it is possible that the requested data is located at remote memory of another processor (e.g., a probability of 50% for random data access). In that situation, an LLC miss is handled using traditional MESIF behavior by broadcasting the request over the interconnect.

When a request is received, the possible states of the requested data at the home node include exclusive (E), forward (F), and invalid (I). The NaMESIF protocol manages these states and their transitions differently than the regular MESIF protocol.

For example, the exclusive (E) state implies that there are no other copies of the data in either the forward (F) or shared (S) states. In this case, local memory supplies the data and changes the state to forward (F) in the home node.

The forward (F) state implies that there are one or more copies of the data in the shared (S) state. In this case, local memory supplies the data and leaves the forward (F) state unchanged in the home node.

The invalid state introduces complexity, as it implies that the state of any external copies could be modified (M), exclusive (E), or forward (F) plus zero or more shared (S). In this case, to simplify the protocol, the home node informs the requestor to follow the traditional MESIF protocol and broadcast the data request.

In the illustrated example, the process flow begins after a cache miss occurs (e.g., an LLC miss) at a particular node in the system. For example, after the cache miss, the process flow begins at block 202 to determine if the NUMA-aware (NA) flag is set (e.g., based on the interconnect bandwidth utilization).

If the NA flag is not set, then interconnect utilization is normal, and the process flow proceeds to block 204, where the regular MESIF protocol is followed by broadcasting the data request over the interconnect.

If the NA flag is set, then interconnect utilization is high, and the process flow proceeds to block 206 to determine whether the home node (HN) of the requested data is local to the requesting node (e.g., on the same socket).

If the home node is not local to the requesting node, the process flow proceeds to block 204, where the regular MESIF protocol is followed by broadcasting the data request over the interconnect.

If the home node is local to the requesting node, the process flow proceeds to block 208, where the data request is sent to the home node.

The process flow then proceeds to block 210 to determine whether the state of the requested data tracked at the home node is "forward" (e.g., the requested data resides in one cache in the forward (F) state and zero or more caches in the shared (S) state).

If the state of the requested data tracked at the home node is "forward," the process flow proceeds to block 212, where the home node serves the requested data from local memory and leaves the "forward" state unchanged.

If the state of the requested data tracked at the home node is not "forward," the process flow proceeds to block 214 to determine whether the state of the requested data is "exclusive" (e.g., the requested data resides in at most one cache).

If the state of the requested data is "exclusive," the process flow proceeds to block 216, where the home node serves the requested data from local memory and updates the state to "forward."

If the state of the requested data is not "exclusive," then the state must be "invalid," and the process flow proceeds to block 218. In some embodiments, at block 218, the home node informs the requesting node to broadcast the data request and follow the regular MESIF protocol. Alternatively, at block 218, the home node broadcasts the data request on behalf of the requesting node and informs the requesting and responding nodes to follow the regular MESIF protocol.

At this point, the process flow may be complete. In some embodiments, however, the process flow may restart and/or certain blocks may be repeated. For example, in some embodiments, the process flow may restart at block 202 to process the next cache miss.

It should be appreciated that the algorithm shown in process flow 200 is merely one possible implementation of the NaMESIF protocol, as other implementations are also possible. In some embodiments, for example, the NA flag may be integrated as a single bit in the data request rather than as a system-wide hardware flag, enabling the receivers of the request (e.g., potential providers of data) to handle the request accordingly. However, that approach would introduce additional complexity due to the nondeterministic nature of message arrival order. The approach shown in process flow 200 avoids such complexity and thus is easier to implement.

Figure 3A:
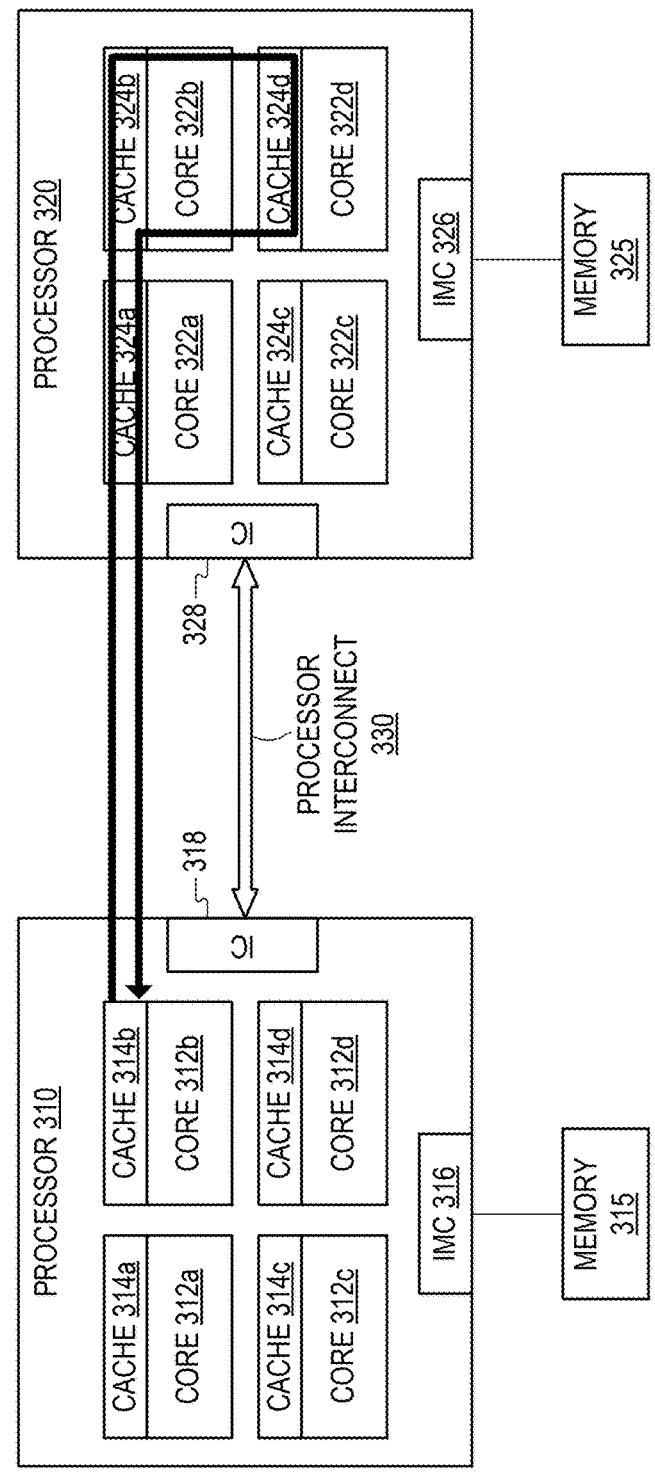
FIGS. 3A-B illustrate example behavior of a NUMA-aware cache coherence protocol in a multiprocessor computing system at different levels of interconnect utilization.
Figure 3B:
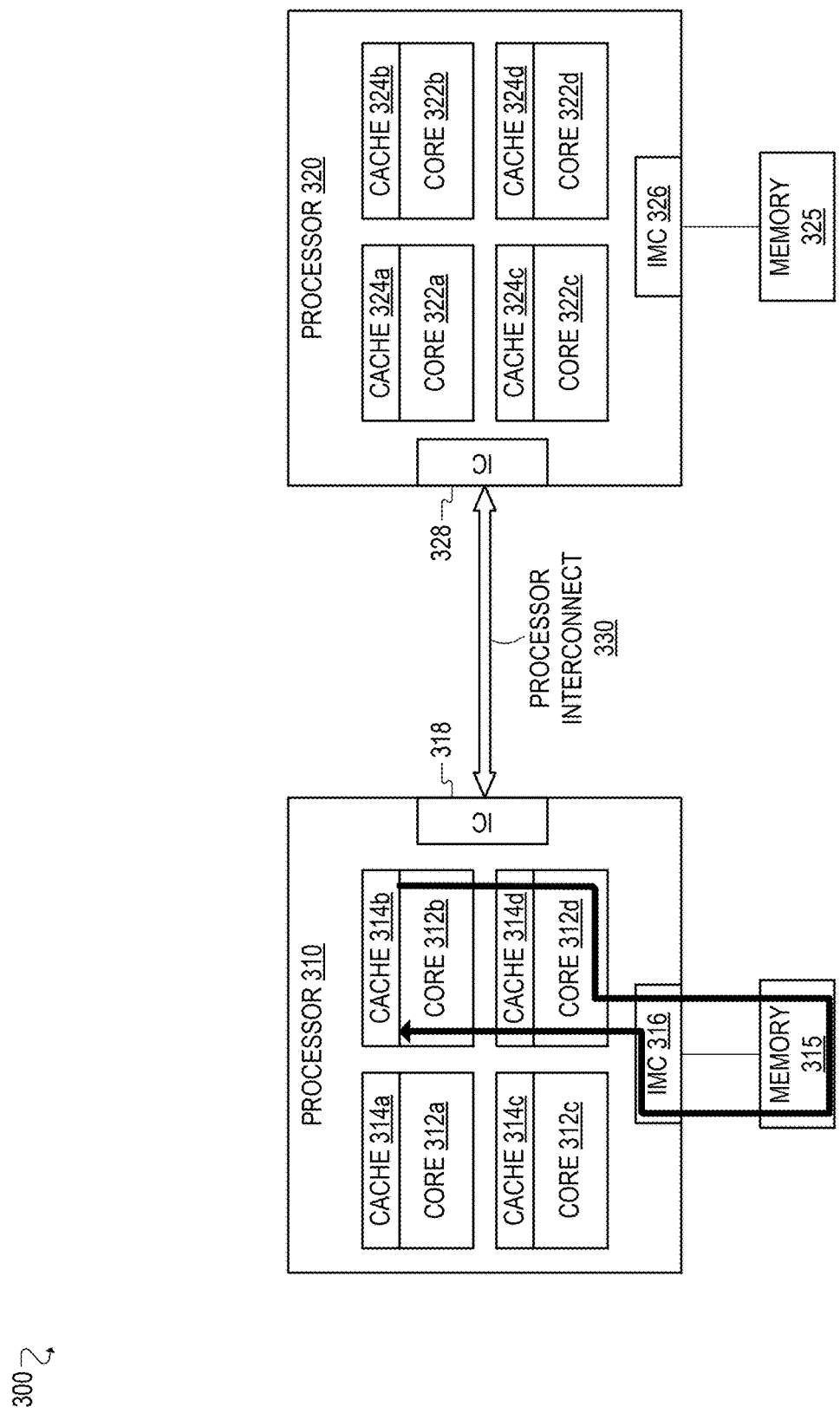

FIGS. 3A-B illustrate example behavior of a NUMA-aware cache coherence protocol in a multiprocessor computing system 300 at different levels of interconnect utilization. In the illustrated example, the multiprocessor computing system 300 includes two processors 310, 320 coupled via a processor interconnect 330. Each processor 310, 320 includes four cores 312a-d, 322a-d, four caches 314a-d, 324a-d associated with the four cores (along with corresponding cache controllers), an integrated memory controller 316, 326, and an interconnect controller 318, 328. Further, the integrated memory controller 316, 326 of each processor 310, 320 is coupled to a corresponding memory module 315, 325.

FIG. 3A illustrates the behavior of the protocol when interconnect utilization is normal (e.g., less than 70% bandwidth utilization). In the illustrated example, a cache miss occurs in cache 314b of core 312b on processor 310, and since interconnect utilization is normal, the cache miss is satisfied via a remote cache-to-cache transfer over the processor interconnect 330 from remote cache 324d of core 322b on processor 320.

FIG. 3B illustrates the behavior of the protocol when interconnect utilization is high (e.g., 70% bandwidth utilization or higher). In the illustrated example, when the cache miss occurs in cache 314b, the cache miss is satisfied by local memory 315 instead of the remote cache 324d over the interconnect 330, thus reducing the amount of traffic over the busy interconnect 330.

Figure 4B:
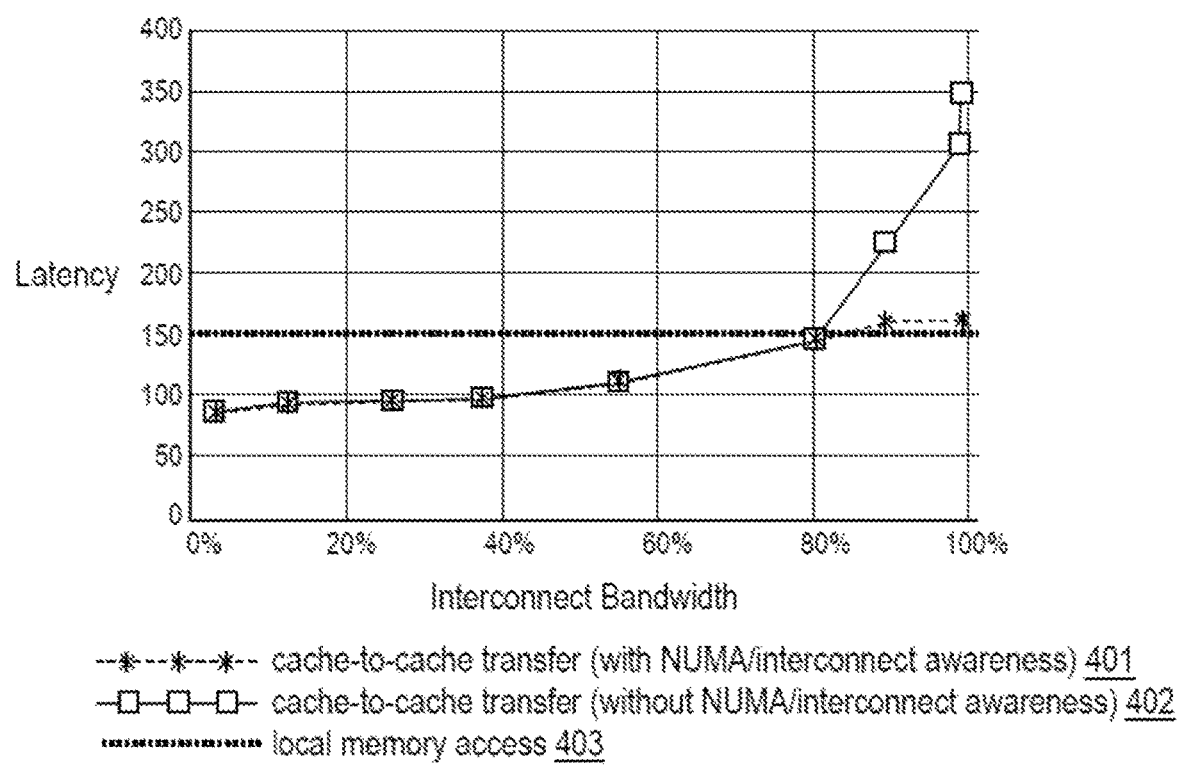

FIGS. 4A-B illustrate graphs depicting the problem area along with the performance of various cache coherency solutions. In particular, FIG. 4A shows a graph depicting the correlation between queuing delay and interconnect utilization. As shown in the graph, the queuing delay increases very gradually until the interconnect utilization reaches approximately 60-70%, at which point the increase in queuing delay becomes increasingly steep. In particular, the queuing delay more than doubles as utilization jumps from 80% to 90%, and then doubles once again as utilization jumps from 90% to 95%. As a result, cache-to-cache transfer latency increases significantly, which decreases interconnect throughput and reduces overall compute performance.

FIG. 4B illustrates a graph of the cache-to-cache transfer latency of various cache coherency solutions, along with the local memory access latency, based on varying levels of interconnect utilization. In particular, the graph shows the cache-to-cache transfer latency 401 of the described solution using NUMA/interconnect awareness, the cache-to-cache transfer latency 402 without using NUMA/interconnect awareness, and the local memory access latency 403. As depicted in the graph, the cache-to-cache transfer latencies 401, 402 of the respective solutions remain similar until the interconnect bandwidth utilization hits 80%, which is shortly after the described solution is activated. In particular, when interconnect utilization is high, the cache-to-cache transfer latencies 401, 402 increase and eventually exceed the local memory access latency 403. As a result, the described solution is activated, which causes each local cache miss to be serviced from local memory whenever possible instead of from a remote cache over the processor interconnect. In this manner, some of the interconnect bandwidth that would normally be consumed by remote cache-to-cache transfers frees up, which allows the cache-to-cache transfer latency 401 to remain relatively constant instead of drastically increasing 402.

For example, the interconnect traffic is largely due to REMOTE_HIT_FORWARD conditions, where data reads miss the L3 cache and clean/shared data (e.g., data cached in the forward (F) state) is transferred from a remote cache. In some test workloads, for example, over than 72% of level 3 (L3) cache misses are satisfied by remote cache-to-cache transfers. Moreover, among all L3 cache misses, the number of REMOTE_HIT_FORWARD conditions is approximately three times that of REMOTE_HITM, which is where data reads miss the L3 cache and modified data (e.g., data cached in the modified (M) state) is transferred from a remote cache. The significance of this is that REMOTE_HIT_FORWARD conditions can be satisfied from memory, while REMOTE_HITM conditions must be satisfied from the remote cache with the modified data. Accordingly, in the described solution, when interconnect utilization is high, REMOTE_HIT_FORWARD conditions are temporarily satisfied from memory instead of remote cache transfers until interconnect utilization drops back to stable levels.

Figure 5:
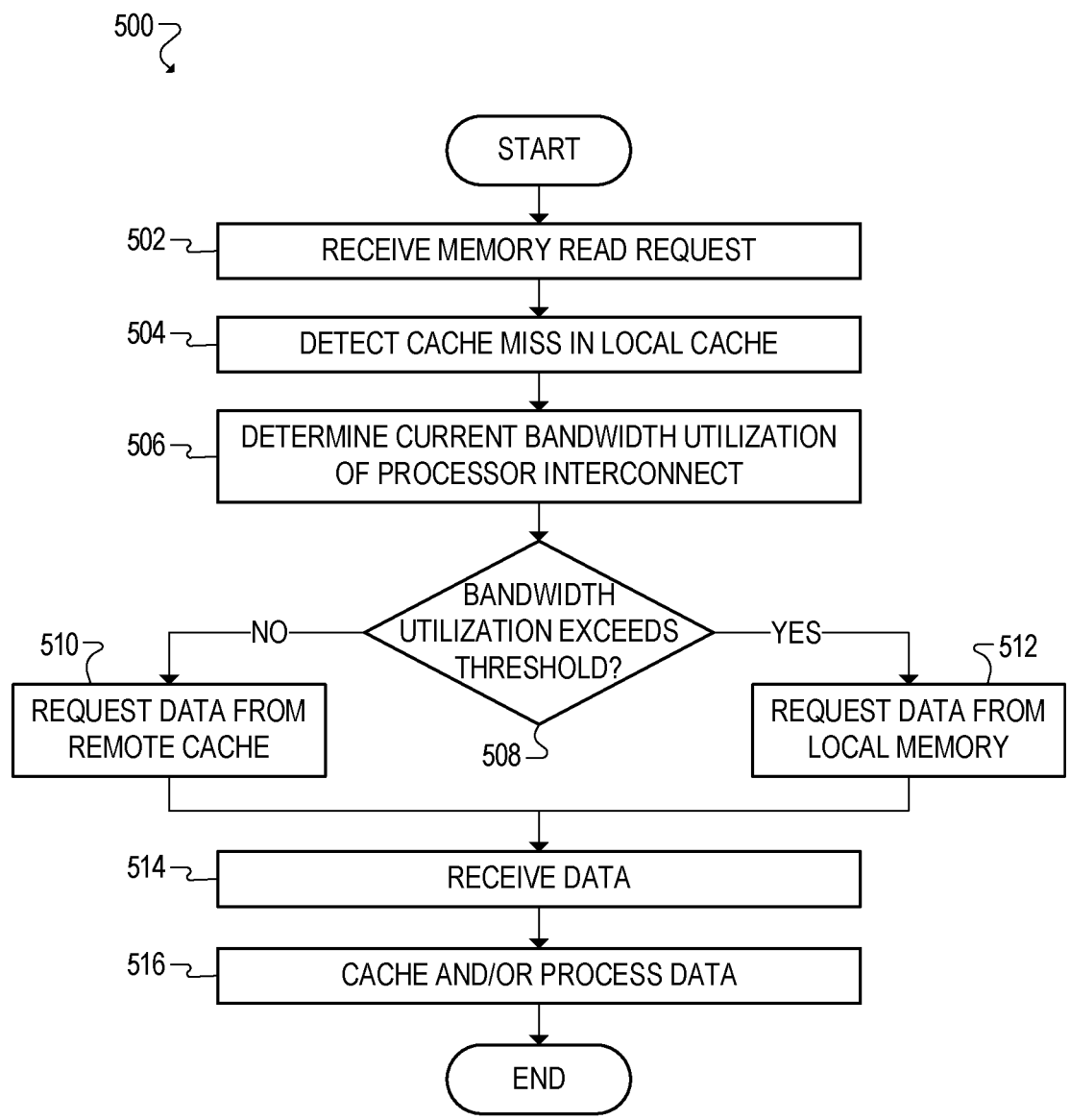
FIG. 5 illustrates a flowchart for a dynamic cache coherence protocol that adapts based on runtime interconnect utilization in accordance with certain embodiments.

FIG. 5 illustrates a flowchart 500 for a dynamic cache coherence protocol that adapts based on runtime interconnect utilization in accordance with certain embodiments. In some embodiments, flowchart 500 may be performed by the computing devices and systems illustrated and described throughout this disclosure (e.g., the computing devices and systems of FIGS. 1, 3, 6-12).

In some embodiments, for example, flowchart 500 may be implemented by a non-uniform memory access (NUMA) computing system to provide cache coherency across its respective caches and/or memories. For example, the computing system may be a multiprocessor system with multiple processors (e.g., CPUs, GPUs, accelerators), and each processor may include one or more processor cores. In some embodiments, each processor may be connected to the same printed circuit board via a corresponding socket. Moreover, the respective processors within the multiprocessor system, and the respective processor cores within each processor, may be connected via interconnect circuitry, such as an unordered or point-to-point processor interconnect along with corresponding interconnect controllers. Each processor may also include one or more memory controllers that are each coupled to a corresponding memory module (e.g., DRAM). Further, each processor may also include one or more caches and associated cache controllers. In some embodiments, for example, each core of a processor has its own level 1 (L1) and/or level 2 (L2) cache, and the cores also share a last level cache (LLC). In some embodiments, the shared LLC is physically distributed across the cores, such that each core has a corresponding slice of the shared LLC. Further, in some embodiments, the processor and/or cores also include corresponding cache controllers for their respective caches.

The various components of the computing system may also be characterized as being "local" or "remote" relative to each other. For example, a "local" processor versus a "remote" processor may refer to separate processors in the same computing system relative to one another. More specifically, relative to a particular "local" processor in the computing system, a "remote" processor may be another, separate processor coupled via the processor interconnect. Similarly, a "local" cache may refer to a cache of a particular processor or core, while a "remote" cache may refer to a cache of another "remote" processor or core. Moreover, "local" memory of a particular processor may refer to memory coupled to a memory controller of that processor, while "remote" memory may refer to memory coupled to a memory controller of another remote processor in the computing system.

Further, the computing system can be viewed as a collection of "nodes" coupled via a processor interconnect. For example, a "node" may refer to a processing node, such as an individual processor (e.g., CPU, GPU, accelerator) within the multiprocessor system, an individual processor core within a multi-core processor (e.g., multi-core CPU, GPU, accelerator), and/or any other discrete processing unit or circuitry within the system. In addition, a "node" may also refer to the corresponding caches and cache controllers associated with a particular processing node.

Moreover, in some embodiments, flowchart 500 may be performed by one or more "nodes" in the computing system, such as cache controller circuitry associated with a particular cache and/or processor core.

The flowchart begins at block 502 by receiving a memory read request for a corresponding memory address. For example, the memory read request may be generated by processing circuitry of one of the processing nodes, such as a processor or core, and may be received by a cache controller associated with a local cache of that processing node.

The flowchart then proceeds to block 504, where a cache miss is detected in the local cache after performing a cache lookup for the corresponding memory address specified in the memory read request. In some cases, for example, the local cache may not contain a valid copy of the data for that memory address. For example, the local cache may not contain a cache line with a copy of the data for that memory address, or the local cache may contain a cache line with an invalid copy of the data (e.g., out-of-date). As a result, a cache miss is detected in the local cache.

The flowchart then proceeds to block 506 to determine the current bandwidth utilization of the processor interconnect. In some embodiments, for example, each processor includes performance monitoring circuitry to monitor the system performance, including the bandwidth utilization of the processor interconnect. Thus, in some embodiments, the current bandwidth utilization (or an indication thereof) is received or otherwise obtained from the performance monitoring circuitry (e.g., via a corresponding hardware register).

The flowchart then proceeds to block 508 to determine whether to request the data from another cache or from main memory based on the current bandwidth utilization of the processor interconnect. For example, if the current bandwidth utilization of the interconnect is relatively stable, the data may be requested from another cache-such as a remote cache of a remote processor-via the processor interconnect. Alternatively, if the current bandwidth utilization of the interconnect is high, the data may be requested from local memory via a memory controller of the particular processor.

For example, some embodiments may determine whether the current bandwidth utilization of the processor interconnect exceeds a threshold. If the current bandwidth utilization does not exceed the threshold, the data is requested from a remote cache, and if the current bandwidth utilization exceeds the threshold, the data is requested from local memory. In some embodiments, the processor and/or performance monitoring circuitry may include a hardware register to configure the threshold.

In some embodiments, for example, a collection of bandwidth utilization measurements or samples for the processor interconnect are received from the performance monitoring circuitry over the current time window. The bandwidth measurements are then compared to the threshold to determine whether a particular percentage of the bandwidth measurements exceed the threshold. Alternatively, other approaches may be used, such as computing the average bandwidth utilization based on the bandwidth measurements over the current time window, and then comparing the average bandwidth utilization to the threshold.

Further, in some embodiments, if the threshold is exceeded, a hardware flag or parameter is set or enabled in the processor or another system component, such as via a platform status/configuration register, a processor instruction, and/or any other suitable mechanism. In this manner, setting the flag indicates that, to the extent possible, cache misses should be satisfied via local memory rather than remote cache-to-cache transfers due to high interconnect utilization.

The hardware flag may subsequently be cleared once the interconnect utilization lowers and no longer exceeds the threshold (e.g., after a certain percentage of bandwidth measurements over the current time window are at or below the threshold). In this manner, clearing the flag indicates that, to the extent possible, cache misses can resume being satisfied via cache-to-cache transfers rather than from local memory.

Upon determining at block 508 that the data should be requested from a remote cache (e.g., the current bandwidth utilization of the processor interconnect does not exceed the threshold), the flowchart proceeds to block 510 to request the data from a remote cache via the processor interconnect. In some embodiments, the request may be broadcast to all remote caches in the system via the processor interconnect.

Alternatively, upon determining at block 508 that the data should be requested from local memory (e.g., the current bandwidth utilization of the processor interconnect exceeds the threshold), the flowchart proceeds to block 512 to request the data from local memory via a memory controller.

The flowchart then proceeds to block 514, where the data is received in response to the request from either a remote cache or local memory, depending on where the data was requested from.

For example, if the data was requested from a remote cache at block 510, the data may be received from one of the remote caches via the processor interconnect. In some embodiments, for example, the data may be received from the particular remote cache whose cache line containing the data is designated in the "forward" state.

Alternatively, if the data was requested from local memory, the data may be received from local memory via a local memory controller and/or home node.

The flowchart then proceeds to block 516 to cache and/or process the data. For example, the cache controller may write the data to the local cache of the processing node, and/or the processing node may perform any appropriate processing on the data via execution of the requisite processor instructions.

At this point, the flowchart may be complete. In some embodiments, however, the flowchart may restart and/or certain blocks may be repeated. For example, in some embodiments, the flowchart may restart at block 502 to continue receiving and processing memory read requests.

Computing Devices, Systems, and Architectures

The following section presents examples of computing devices, systems, and architectures that may be used to implement, or may be implemented with, the cache coherency solution described throughout this disclosure.

Example Core Architectures

FIG. 6A is a block diagram illustrating both an exemplary in-order pipeline and an exemplary register renaming, out-of-order issue/execution pipeline according to certain embodiments. FIG. 6B is a block diagram illustrating both an exemplary embodiment of an in-order architecture core and an exemplary register renaming, out-of-order issue/execution architecture core to be included in a processor according to certain embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to certain embodiments. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative certain embodiments may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to certain embodiments. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Figure 8:
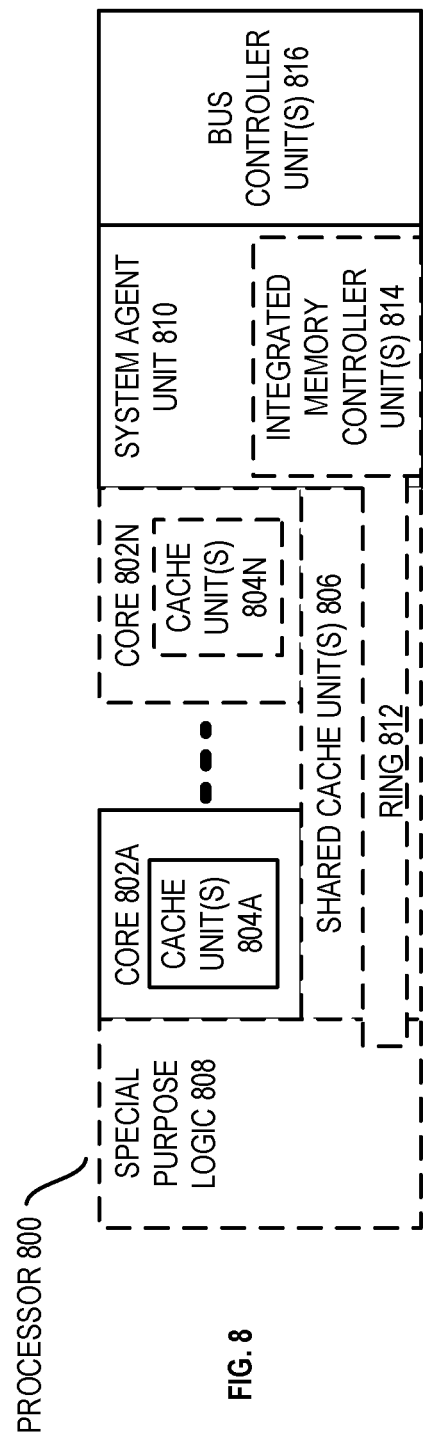
FIG. 8 is a block diagram of a processor that may have more than one core, may have an integrated memory controller, and may have integrated graphics according to certain embodiments.

FIG. 8 is a block diagram of a processor 800 that may have more than one core, may have an integrated memory controller, and may have integrated graphics according to certain embodiments. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Example Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
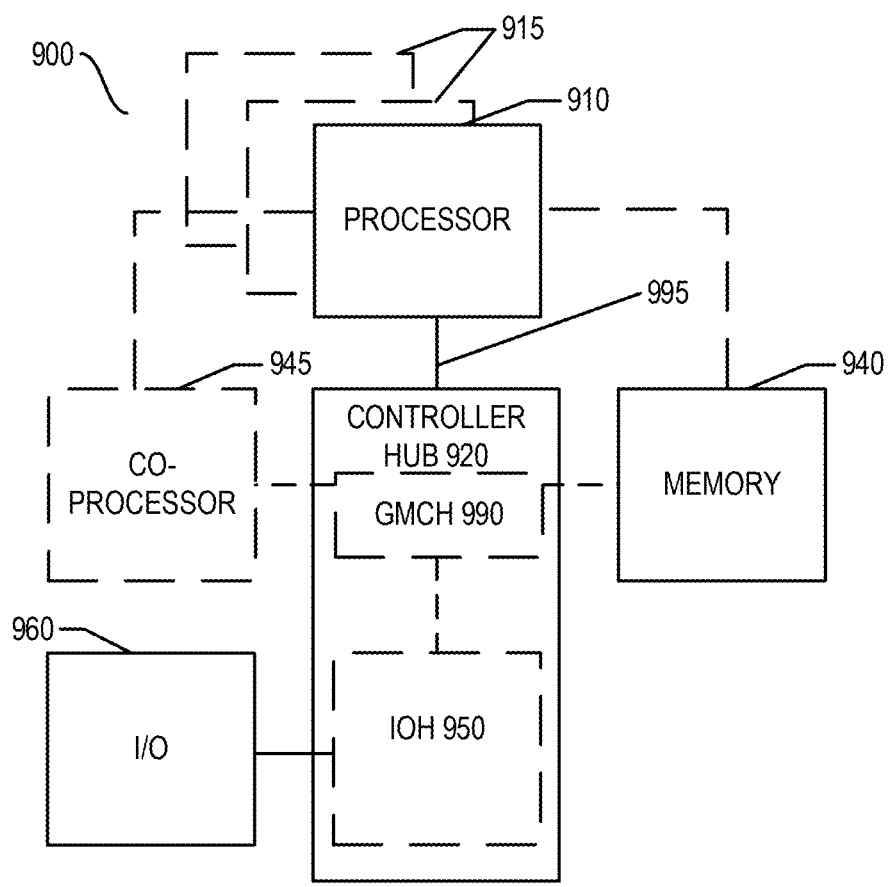
FIGS. 9, 10, 11, and 12 are block diagrams of exemplary computer architectures.

Referring now to FIG. 9, shown is a block diagram of a system 900 in accordance with one embodiment. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
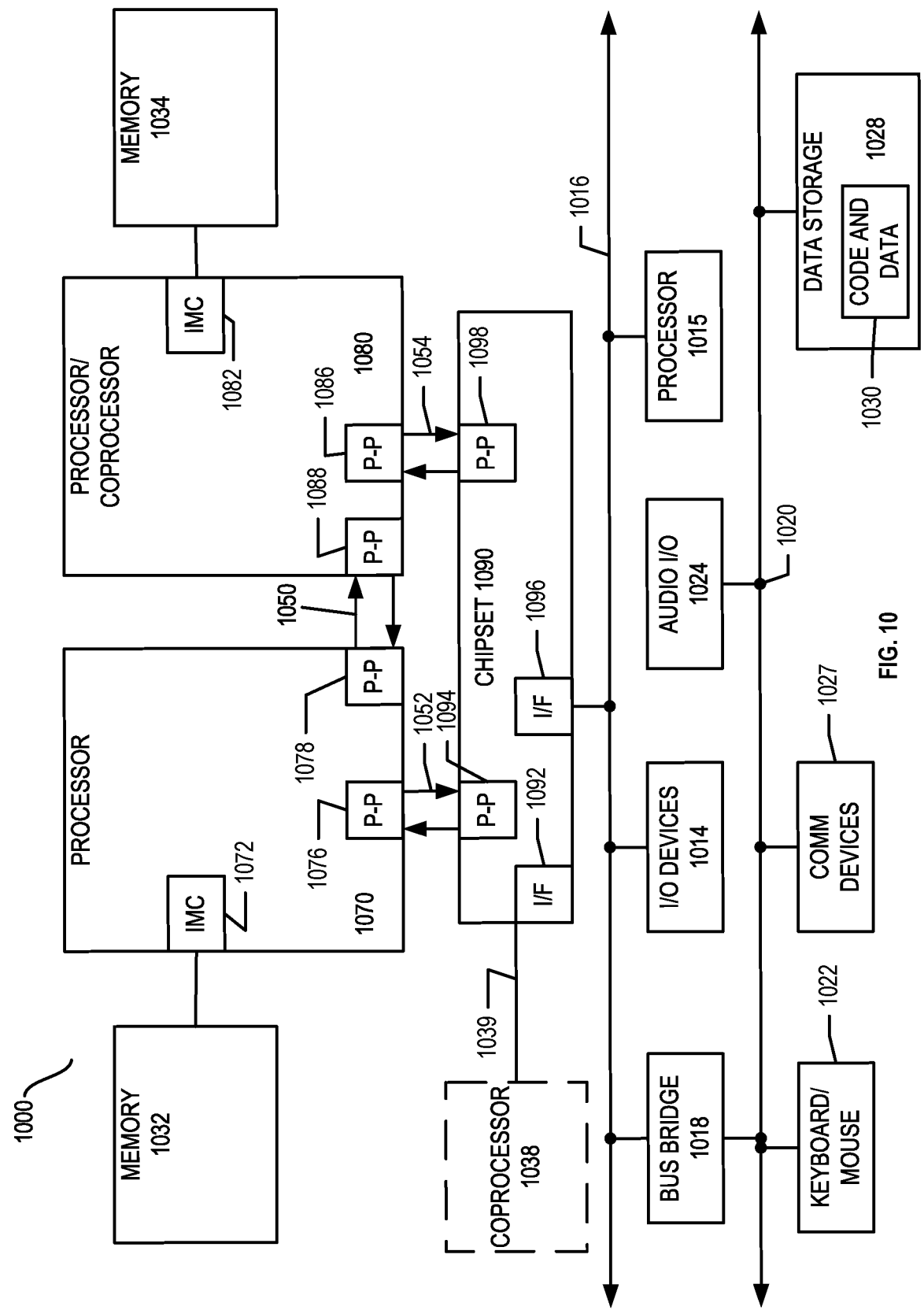

Referring now to FIG. 10, shown is a block diagram of a first more specific exemplary system 1000 in accordance with an embodiment. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
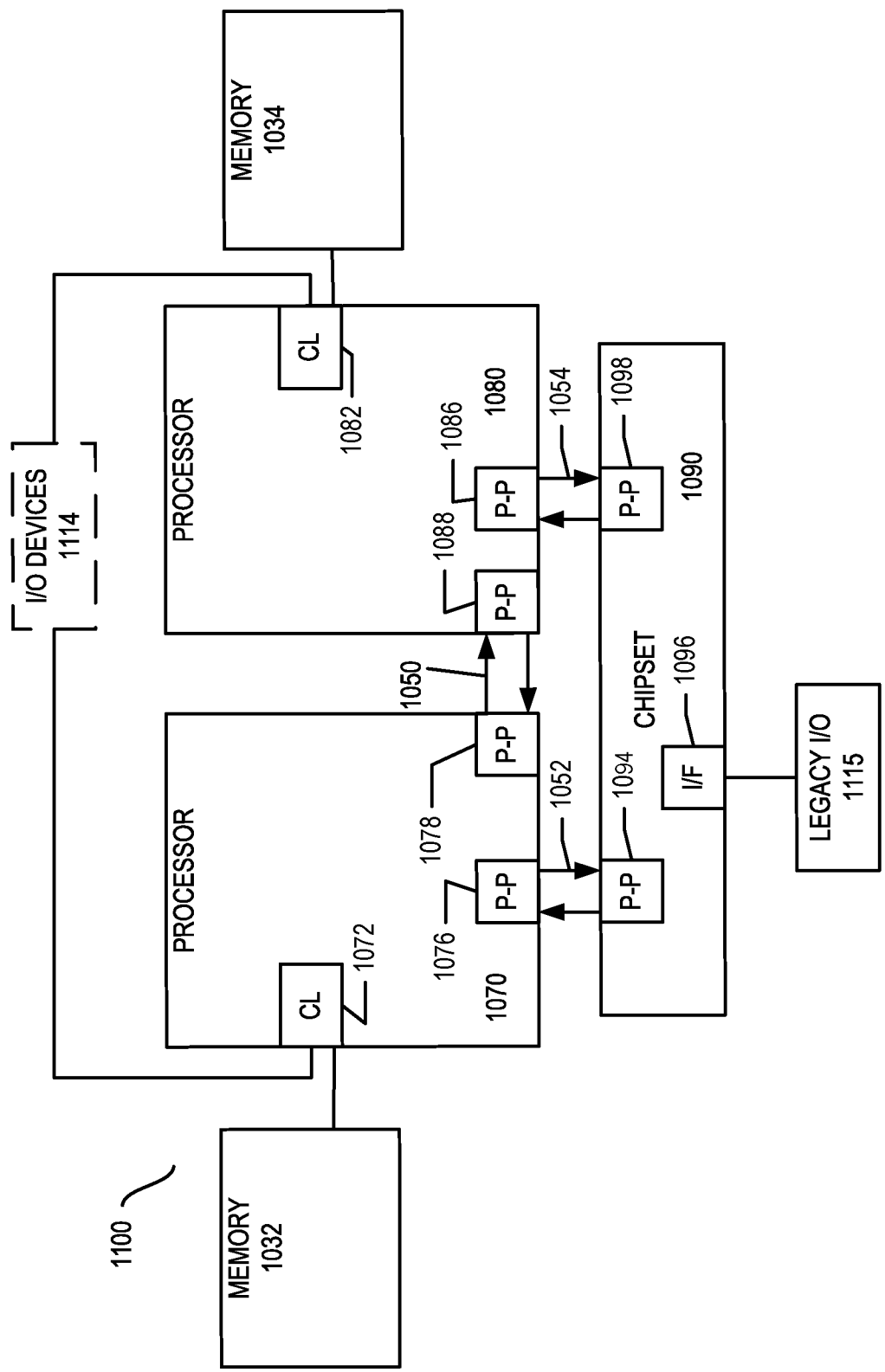

Referring now to FIG. 11, shown is a block diagram of a second more specific exemplary system 1100 in accordance with an embodiment. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
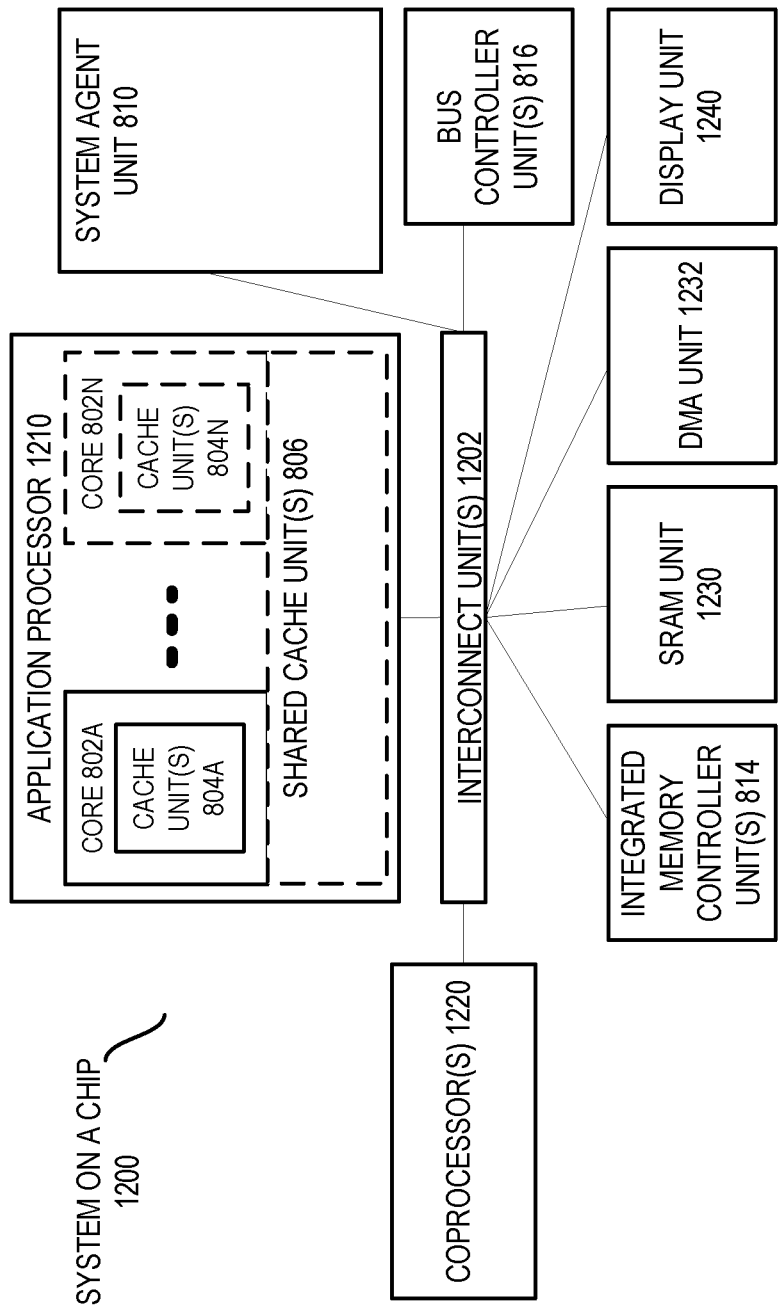

Referring now to FIG. 12, shown is a block diagram of a SoC 1200 in accordance with an embodiment. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, certain embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

EXAMPLE EMBODIMENTS

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes a processor, comprising: a first cache; interconnect circuitry to communicate with a second processor via a processor interconnect, wherein the second processor comprises a second cache; processing circuitry to generate a memory read request for a corresponding memory address of a memory; and cache controller circuitry to: detect, based on the memory read request, a cache miss in the first cache, wherein the cache miss indicates that the first cache does not contain a valid copy of data for the corresponding memory address; and request, based on the cache miss, the data from the second cache or the memory, wherein the second cache or the memory is selected for the request based on a current bandwidth utilization of the processor interconnect.

Example 2 includes the processor of Example 1, wherein the cache controller circuitry to request, based on the cache miss, the data from the second cache or the memory is further to: determine, based on the current bandwidth utilization of the processor interconnect, whether to request the data from the second cache or the memory; upon determining to request the data from the second cache, request, via the processor interconnect, the data from the second cache; and upon determining to request the data from the memory, request, via a memory controller, the data from the memory.

Example 3 includes the processor of Example 2, wherein the cache controller circuitry to determine, based on the current bandwidth utilization of the processor interconnect, whether to request the data from the second cache or the memory is further to: determine whether the current bandwidth utilization exceeds a threshold; upon determining that the current bandwidth utilization does not exceed the threshold, determine that the data is to be requested from the second cache; and upon determining that the current bandwidth utilization exceeds the threshold, determine that the data is to be requested from the memory.

Example 4 includes the processor of Example 3, further comprising a hardware register to configure the threshold.

Example 5 includes the processor of any of Examples 3-4, further comprising performance monitoring circuitry to monitor the current bandwidth utilization of the processor interconnect.

Example 6 includes the processor of Example 5, wherein the cache controller circuitry to determine whether the current bandwidth utilization exceeds the threshold is further to: receive, via the performance monitoring circuitry, a plurality of bandwidth utilization measurements for the processor interconnect over a current time window; and determine whether a particular percentage of the bandwidth utilization measurements exceed the threshold.

Example 7 includes the processor of any of Examples 2-6, wherein: the cache controller circuitry to request, via the processor interconnect, the data from the second cache is further to: receive, via the processor interconnect, the data from the second cache; and write the data to the first cache; the cache controller circuitry to request, via the memory controller, the data from the memory is further to: receive, via the memory controller, the data from the memory; and write the data to the first cache.

Example 8 includes the processor of any of Examples 1-7, wherein: the data is stored in the memory at the corresponding memory address; and the valid copy of the data is stored in the second cache, wherein the valid copy of the data is designated in a forward state in the second cache.

Example 9 includes at least one non-transitory machine-readable storage medium having instructions stored thereon, wherein the instructions, when executed on or implemented by a first processor, cause the first processor to: receive a memory read request for a corresponding memory address; detect, based on the memory read request, a cache miss in a first cache of the first processor, wherein the cache miss indicates that the first cache does not contain a valid copy of data for the corresponding memory address; and request, based on the cache miss, the data from a second cache of a second processor or from a memory, wherein the second processor is communicatively coupled to the first processor via a processor interconnect, and wherein the second cache or the memory is selected for the request based on a current bandwidth utilization of the processor interconnect.

Example 10 includes the storage medium of Example 9, wherein the instructions that cause the first processor to request, based on the cache miss, the data from the second cache of the second processor or from the memory further cause the first processor to: determine, based on the current bandwidth utilization of the processor interconnect, whether to request the data from the second cache or the memory; upon determining to request the data from the second cache, request, via the processor interconnect, the data from the second cache; and upon determining to request the data from the memory, request, via a memory controller, the data from the memory.

Example 11 includes the storage medium of Example 10, wherein the instructions that cause the first processor to determine, based on the current bandwidth utilization of the processor interconnect, whether to request the data from the second cache or the memory further cause the first processor to: determine whether the current bandwidth utilization exceeds a threshold; upon determining that the current bandwidth utilization does not exceed the threshold, determine that the data is to be requested from the second cache; and upon determining that the current bandwidth utilization exceeds the threshold, determine that the data is to be requested from the memory.

Example 12 includes the storage medium of Example 11, wherein the instructions that cause the first processor to determine whether the current bandwidth utilization exceeds the threshold further cause the first processor to: receive, via performance monitoring circuitry, a plurality of bandwidth utilization measurements for the processor interconnect over a current time window; and determine whether a particular percentage of the bandwidth utilization measurements exceed the threshold.

Example 13 includes the storage medium of any of Examples 9-12, wherein: the data is stored in the memory at the corresponding memory address; and the valid copy of the data is stored in the second cache, wherein the valid copy of the data is designated in a forward state in the second cache.

Example 14 includes a method performed by a first processor, comprising: receiving a memory read request for a corresponding memory address; detecting, based on the memory read request, a cache miss in a first cache of the first processor, wherein the cache miss indicates that the first cache does not contain a valid copy of data for the corresponding memory address; and requesting, based on the cache miss, the data from a second cache of a second processor or from a memory, wherein the second processor is communicatively coupled to the first processor via a processor interconnect, and wherein the second cache or the memory is selected for the request based on a current bandwidth utilization of the processor interconnect.

Example 15 includes the method of Example 14, wherein requesting, based on the cache miss, the data from the second cache of the second processor or from the memory comprises: determining, based on the current bandwidth utilization of the processor interconnect, whether to request the data from the second cache or the memory; upon determining to request the data from the second cache, requesting, via the processor interconnect, the data from the second cache; and upon determining to request the data from the memory, requesting, via a memory controller, the data from the memory.

Example 16 includes the method of Example 15, wherein determining, based on the current bandwidth utilization of the processor interconnect, whether to request the data from the second cache or the memory comprises: determining whether the current bandwidth utilization exceeds a threshold; upon determining that the current bandwidth utilization does not exceed the threshold, determining that the data is to be requested from the second cache; and upon determining that the current bandwidth utilization exceeds the threshold, determining that the data is to be requested from the memory.

Example 17 includes the method of Example 16, wherein determining whether the current bandwidth utilization exceeds the threshold comprises: receiving, via performance monitoring circuitry, a plurality of bandwidth utilization measurements for the processor interconnect over a current time window; and determining whether a particular percentage of the bandwidth utilization measurements exceed the threshold.

Example 18 includes the method of any of Examples 14-17, wherein: the data is stored in the memory at the corresponding memory address; and the valid copy of the data is stored in the second cache, wherein the valid copy of the data is designated in a forward state in the second cache.

Example 19 includes a system, comprising: interconnect circuitry to communicate with a remote processor via a processor interconnect, wherein the remote processor comprises a remote cache; a local memory; and a local processor, comprising: a memory controller to access the local memory; a local cache; one or more processor cores to generate a memory read request for a corresponding memory address; and cache controller circuitry to: detect, based on the memory read request, a cache miss in the local cache, wherein the cache miss indicates that the local cache does not contain a valid copy of data for the corresponding memory address; and request, based on the cache miss, the data from the remote cache or the local memory, wherein the remote cache or the local memory is selected for the request based on a current bandwidth utilization of the processor interconnect.

Example 20 includes the system of Example 19, further comprising: the processor interconnect; and the remote processor.

Example 21 includes the system of any of Examples 19-20, wherein the cache controller circuitry to request, based on the cache miss, the data from the remote cache or the local memory is further to: determine, based on the current bandwidth utilization of the processor interconnect, whether to request the data from the remote cache or the local memory; upon determining to request the data from the remote cache, request, via the processor interconnect, the data from the remote cache; and upon determining to request the data from the local memory, request, via the memory controller, the data from the local memory.

Example 22 includes the system of Example 21, wherein the cache controller circuitry to determine, based on the current bandwidth utilization of the processor interconnect, whether to request the data from the remote cache or the local memory is further to: determine whether the current bandwidth utilization exceeds a threshold; upon determining that the current bandwidth utilization does not exceed the threshold, determine that the data is to be requested from the remote cache; and upon determining that the current bandwidth utilization exceeds the threshold, determine that the data is to be requested from the local memory.

Example 23 includes the system of Example 22, further comprising: a hardware register to configure the threshold; and performance monitoring circuitry to monitor the current bandwidth utilization of the processor interconnect.

Example 24 includes the system of Example 23, wherein the cache controller circuitry to determine whether the current bandwidth utilization exceeds the threshold is further to: receive, via the performance monitoring circuitry, a plurality of bandwidth utilization measurements for the processor interconnect over a current time window; and determine whether a particular percentage of the bandwidth utilization measurements exceed the threshold.

Example 25 includes the system of any of Examples 19-24, wherein: the data is stored in the local memory at the corresponding memory address; and the valid copy of the data is stored in the remote cache, wherein the valid copy of the data is designated in a forward state in the remote cache.

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

What is claimed is:

1. A processor, comprising:
a first cache;
interconnect circuitry to communicate with a second processor via a processor interconnect, wherein the second processor comprises a second cache;
processing circuitry to generate a memory read request for a corresponding memory address of a memory; and
cache controller circuitry to:
detect, based on the memory read request, a cache miss in the first cache, wherein the cache miss indicates that the first cache does not contain a valid copy of data for the corresponding memory address; and
request, based on the cache miss, the data from the second cache or the memory, wherein the second cache or the memory is selected for the request based on a current bandwidth utilization of the processor interconnect.

2. The processor of claim 1, wherein the cache controller circuitry to request, based on the cache miss, the data from the second cache or the memory is further to:
determine, based on the current bandwidth utilization of the processor interconnect, whether to request the data from the second cache or the memory;
upon determining to request the data from the second cache, request, via the processor interconnect, the data from the second cache; and
upon determining to request the data from the memory, request, via a memory controller, the data from the memory.

3. The processor of claim 2, wherein the cache controller circuitry to determine, based on the current bandwidth utilization of the processor interconnect, whether to request the data from the second cache or the memory is further to:
determine whether the current bandwidth utilization exceeds a threshold;
upon determining that the current bandwidth utilization does not exceed the threshold, determine that the data is to be requested from the second cache; and
upon determining that the current bandwidth utilization exceeds the threshold, determine that the data is to be requested from the memory.

4. The processor of claim 3, further comprising a hardware register to configure the threshold.

5. The processor of claim 3, further comprising performance monitoring circuitry to monitor the current bandwidth utilization of the processor interconnect.

6. The processor of claim 5, wherein the cache controller circuitry to determine whether the current bandwidth utilization exceeds the threshold is further to:
receive, via the performance monitoring circuitry, a plurality of bandwidth utilization measurements for the processor interconnect over a current time window; and
determine whether a particular percentage of the bandwidth utilization measurements exceed the threshold.

7. The processor of claim 2, wherein:
the cache controller circuitry to request, via the processor interconnect, the data from the second cache is further to:
receive, via the processor interconnect, the data from the second cache; and
write the data to the first cache;
the cache controller circuitry to request, via the memory controller, the data from the memory is further to:
receive, via the memory controller, the data from the memory; and
write the data to the first cache.

8. The processor of claim 1, wherein:
the data is stored in the memory at the corresponding memory address; and
the valid copy of the data is stored in the second cache, wherein the valid copy of the data is designated in a forward state in the second cache.

9. At least one non-transitory machine-readable storage medium having instructions stored thereon, wherein the instructions, when executed on or implemented by a first processor, cause the first processor to:
receive a memory read request for a corresponding memory address;
detect, based on the memory read request, a cache miss in a first cache of the first processor, wherein the cache miss indicates that the first cache does not contain a valid copy of data for the corresponding memory address; and
request, based on the cache miss, the data from a second cache of a second processor or from a memory, wherein the second processor is communicatively coupled to the first processor via a processor interconnect, and wherein the second cache or the memory is selected for the request based on a current bandwidth utilization of the processor interconnect.

10. The storage medium of claim 9, wherein the instructions that cause the first processor to request, based on the cache miss, the data from the second cache of the second processor or from the memory further cause the first processor to:
   determine, based on the current bandwidth utilization of the processor interconnect, whether to request the data from the second cache or the memory;
   upon determining to request the data from the second cache, request, via the processor interconnect, the data from the second cache; and
   upon determining to request the data from the memory, request, via a memory controller, the data from the memory.

11. The storage medium of claim 10, wherein the instructions that cause the first processor to determine, based on the current bandwidth utilization of the processor interconnect, whether to request the data from the second cache or the memory further cause the first processor to:
   determine whether the current bandwidth utilization exceeds a threshold;
   upon determining that the current bandwidth utilization does not exceed the threshold, determine that the data is to be requested from the second cache; and
   upon determining that the current bandwidth utilization exceeds the threshold, determine that the data is to be requested from the memory.

12. The storage medium of claim 11, wherein the instructions that cause the first processor to determine whether the current bandwidth utilization exceeds the threshold further cause the first processor to:
   receive, via performance monitoring circuitry, a plurality of bandwidth utilization measurements for the processor interconnect over a current time window; and
   determine whether a particular percentage of the bandwidth utilization measurements exceed the threshold.

13. The storage medium of claim 9, wherein:
   the data is stored in the memory at the corresponding memory address; and
   the valid copy of the data is stored in the second cache, wherein the valid copy of the data is designated in a forward state in the second cache.

14. A method performed by a first processor, comprising:
   receiving a memory read request for a corresponding memory address;
   detecting, based on the memory read request, a cache miss in a first cache of the first processor, wherein the cache miss indicates that the first cache does not contain a valid copy of data for the corresponding memory address; and
   requesting, based on the cache miss, the data from a second cache of a second processor or from a memory, wherein the second processor is communicatively coupled to the first processor via a processor interconnect, and wherein the second cache or the memory is selected for the request based on a current bandwidth utilization of the processor interconnect.

15. The method of claim 14, wherein requesting, based on the cache miss, the data from the second cache of the second processor or from the memory comprises:
   determining, based on the current bandwidth utilization of the processor interconnect, whether to request the data from the second cache or the memory;
   upon determining to request the data from the second cache, requesting, via the processor interconnect, the data from the second cache; and
   upon determining to request the data from the memory, requesting, via a memory controller, the data from the memory.

16. The method of claim 14, wherein determining, based on the current bandwidth utilization of the processor interconnect, whether to request the data from the second cache or the memory comprises:
   determining whether the current bandwidth utilization exceeds a threshold;
   upon determining that the current bandwidth utilization does not exceed the threshold, determining that the data is to be requested from the second cache; and
   upon determining that the current bandwidth utilization exceeds the threshold, determining that the data is to be requested from the memory.

17. The method of claim 16, wherein determining whether the current bandwidth utilization exceeds the threshold comprises:
   receiving, via performance monitoring circuitry, a plurality of bandwidth utilization measurements for the processor interconnect over a current time window; and
   determining whether a particular percentage of the bandwidth utilization measurements exceed the threshold.

18. The method of claim 14, wherein:
   the data is stored in the memory at the corresponding memory address; and
   the valid copy of the data is stored in the second cache, wherein the valid copy of the data is designated in a forward state in the second cache.

19. A system, comprising:
   interconnect circuitry to communicate with a remote processor via a processor interconnect, wherein the remote processor comprises a remote cache;
   a local memory; and
   a local processor, comprising:
      a memory controller to access the local memory;
      a local cache;
      one or more processor cores to generate a memory read request for a corresponding memory address; and
      cache controller circuitry to:
         detect, based on the memory read request, a cache miss in the local cache, wherein the cache miss indicates that the local cache does not contain a valid copy of data for the corresponding memory address; and
         request, based on the cache miss, the data from the remote cache or the local memory, wherein the remote cache or the local memory is selected for the request based on a current bandwidth utilization of the processor interconnect.

20. The system of claim 19, further comprising:
   the processor interconnect; and
   the remote processor.

21. The system of claim 19, wherein the cache controller circuitry to request, based on the cache miss, the data from the remote cache or the local memory is further to:
   determine, based on the current bandwidth utilization of the processor interconnect, whether to request the data from the remote cache or the local memory;
   upon determining to request the data from the remote cache, request, via the processor interconnect, the data from the remote cache; and upon determining to request the data from the local memory, request, via the memory controller, the data from the local memory.

22. The system of claim 21, wherein the cache controller circuitry to determine, based on the current bandwidth utilization of the processor interconnect, whether to request the data from the remote cache or the local memory is further to:
  determine whether the current bandwidth utilization exceeds a threshold;
  upon determining that the current bandwidth utilization does not exceed the threshold, determine that the data is to be requested from the remote cache; and
  upon determining that the current bandwidth utilization exceeds the threshold, determine that the data is to be requested from the local memory.

23. The system of claim 22, further comprising:
a hardware register to configure the threshold; and
performance monitoring circuitry to monitor the current bandwidth utilization of the processor interconnect.

24. The system of claim 23, wherein the cache controller circuitry to determine whether the current bandwidth utilization exceeds the threshold is further to:
  receive, via the performance monitoring circuitry, a plurality of bandwidth utilization measurements for the processor interconnect over a current time window; and
  determine whether a particular percentage of the bandwidth utilization measurements exceed the threshold.

25. The system of claim 19, wherein:
the data is stored in the local memory at the corresponding memory address; and
the valid copy of the data is stored in the remote cache, wherein the valid copy of the data is designated in a forward state in the remote cache.

* * * * *